May 27, 1969

E. PLANITZER ET AL  3,446,112
VEHICLE MOUNTED PROJECTOR FOR JET-PROPELLED
GUIDED MISSILES WITH ADJUSTABLE
ANGLE OF ELEVATION

Filed Aug. 2, 1967

Inventors
ERICH PLANITZER
EICKE MAUS
ALBERT MULTERER
ERWIN SCHOBER
WERNER SCHINDLER by *MacGlew and Toren*

Attorneys

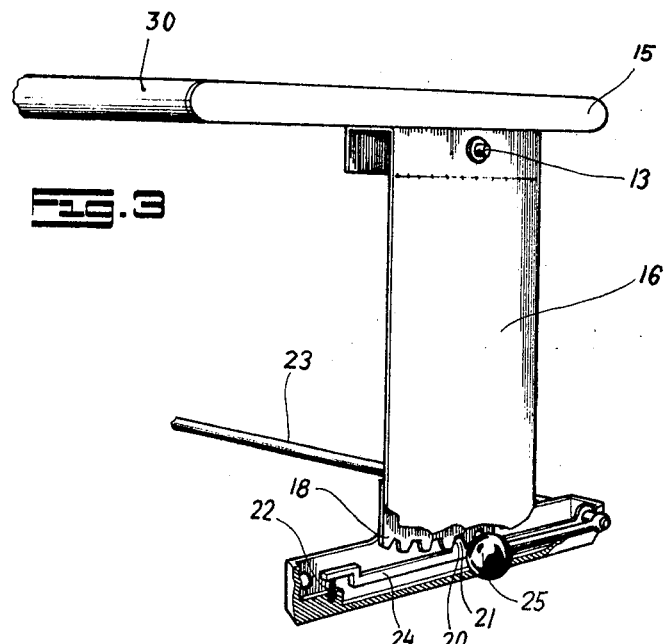
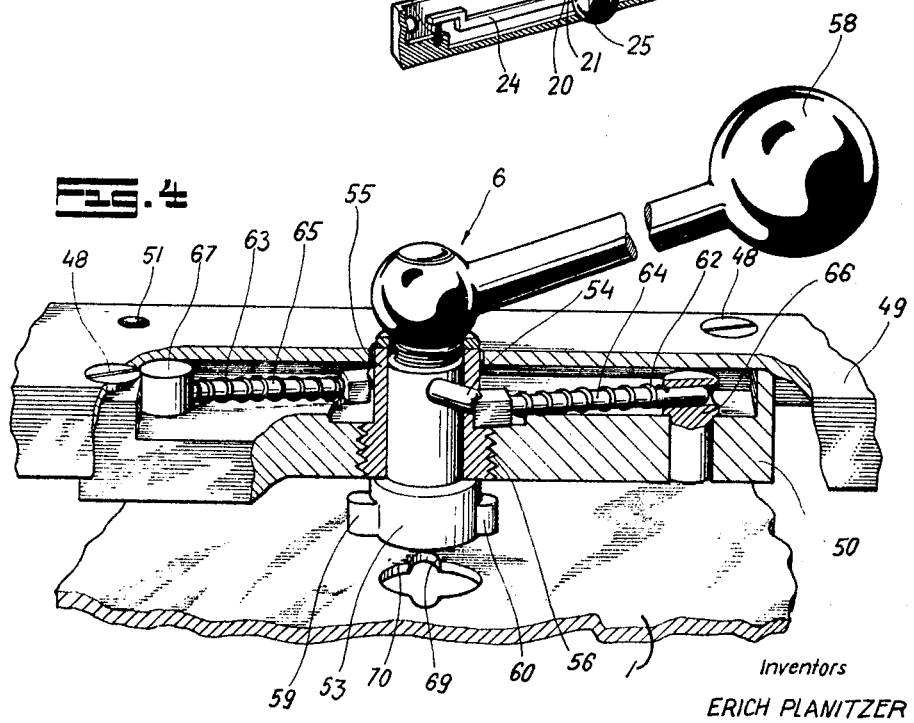

United States Patent Office 3,446,112
Patented May 27, 1969

3,446,112
VEHICLE MOUNTED PROJECTOR FOR JET-PROPELLED GUIDED MISSILES WITH ADJUSTABLE ANGLE OF ELEVATION
Erich Planitzer, Neubiberg, Eicke Maus, Ottobrunn, Albert Multerer, Grabenstett (Chiemsee), Erwin Schober, Neubiberg, and Werner Schindler, Ottobrunn, Germany, assignors to Bolkow Gesellschaft mit beschrankter Haftung, Ottobrunn, Germany
Filed Aug. 2, 1967, Ser. No. 657,847
Claims priority, application Germany, Aug. 5, 1966, B 88,352
Int. Cl. F41f 3/04
U.S. Cl. 89—1.815            4 Claims

ABSTRACT OF THE DISCLOSURE

A projector or launcher for jet-propelled guided missiles is adapted for readily interchangeable mounting upon various types of vehicles and is self-contained with respect to all of the devices necessary for launching, tracking and guiding the individual missiles. The projector is provided with a traversing mechanism and also with means for adjusting the angle of elevation of the missiles. Novel releasable quick-action means are provided for anchoring the missiles during transport and for releasing the missiles individually for launching.

Background of the invention

Projectors or launching platforms for jet-propelled missiles, arranged for use with a self propelled vehicle, are known. As shown, for example, in U.S. Patent 2,429,021, such projectors comprise a platform serving as a firing ramp and provided with a number of longitudinally extending sliding channels having a trapezoidal cross section, a read-to-fire missile being positioned in each channel. During transportation, the missiles are held in their firing positions by spring-loading holding means designed as trapezoidal rails. The platform has two plane-faced vertical side plates in which are arranged horizontal bearing pins which engage two rails secured in the rear parts of the side-walls of the vehicle. By means of an elevating device arranged in the forward portion of the vehicle on the floor thereof, and whose free end is articulated with a cross strut of the platform, the platform can be turned about the bearing pins forming the elevation axis.

Such a projector for so-called ballistic missiles, that is, as a launching ramp for unguided missiles, is, due to its constructional design, suitable only as the equipment on a single type of vehicle. Work shops, and time consuming operations, are necessary for the assembly and disassembly of such a projector with respect to its carrying vehicle. Firing of a missile is possible only in the driving direction of the vehicle, and a traversing movement can be effected only by aiming the vehicle at the target. This has tactical disadvantages.

Another projector suitable for the same type of vehicle is disclosed in published German Auslegeschrift 1,167,227. This projector comprises a frame work base with two superposed platforms on which two guided missiles, arranged side by side, are releasably locked by means of clamping holders. The base is pivotally and disengageably connected with the vehicle by means of hinges secured on the chassis of the vehicle. In its transportation position, the projector is oriented substantially vertically inside the vehicle, while it is swung down into a substantially horizontal firing position outside the vehicle by means of two pivotally mounted supporting struts whose free ends are held in recesses provided on the vehicle.

This latter missile projector is substantially more favorable in its dimensions and weight than is the first mentioned projector and can, if necessary, be mounted on the vehicle without the necessity of utilizing the facilities of a workshop. However, in this case also, long assembly times and special tools are required for mounting the projector since the fastening devices for securing the same on the vehicle are not intended for replacement of the projector. Apart from this, the projector is further suitable for mounting on only one type of vehicle whose sidewalls must have recesses and other arrangements for attachment of hinges, and which vehicle has sufficient interior room to receive the projector during transportation. Finally, the devices necessary for launching, guiding and tracking the missiles, such as signal transmitters, sights and the like must be separately transported, which has disadvantages in many respects.

The missile projectors mentioned above are suitable for mounting on existing vehicles of a certain type in a way such that jet-propelled missiles can be launched from them. However, they are not suitable for being temporarily mounted, in the case of emergency, on any type of vehicle and without the use of special tools.

Summary of the invention

This invention relates to projectors or launching platforms for missiles and, more particularly, to such a launching platform or missile launcher which is readily adaptable to interchangeable mounting on various types of vehicles, constructed for both traverse and elevation adjustment, and self-contained with respect to launching, guiding and tracking components for the individual missiles.

To this end, a projector or launcher for jet-propelled guided missiles is provided which is simple, easy and economical to construct and mount, and which contains all the devices necessary for firing the missile and thus can be stored and shipped as a complete weapon unit. Furthermore, the projector or launching platform can be temporarily mounted on any type of vehicle without the use of special tools.

Using as a starting basis a projector for jet-propelled guided missiles including a vertically adjustable platform connected with the vehicle on which ready-to-launch missiles are releasably locked, in accordance with the invention the projector has associated therewith all of the devices necessary for launching, tracking and guiding the individual missiles, and includes fastening devices designed as rapid locking mechanisms and by means of which it can be interchangeably mounted on any type of vehicle.

A projector in accordance with the invention, provided with ready-to-fire missiles, for example, anti-tank missiles, can be mounted for immediate use, necessary on the basis of changing battle conditions, on any vehicles not designed specifically for guided missiles. For example, it may be mounted on armored cars, tanks, bucket cars, trucks, tractors, etc., and would thus become temporarily a moving firing base for jet-propelled missiles.

By virtue of the use of fastening devices designed as quick locking mechanisms, the projector or launching platform can be mounted on a vehicle rapidly and with little effort. Since all the devices necessary for launching, guiding and tracking the missile, including the missiles, are secured on the projector, the missiles can be used and launched rapidly. The reliability of the weapon is also enhanced due to the fact that it requires only simple transportation and storage facilities.

In accordance with a feature of the invention, the devices required for launching, tracking and guiding the missiles are connected releasably to the projector or missile launcher by means of quick-locking devices. In this manner, the missiles can also be launched and guided from points remote from the vehicle. The projector is preferably so designed that the missile-carrying platform includes a traversing mechanism.

Preferably, the projector includes a base plate provided with two transversely spaced and opposed supports for adjustably mounting the platform, and between these supports, the base plate receives the devices for launching, guiding and tracking the missiles which latter are arranged on the platform. The base plate also includes a locking device arranged at its center, and comprising a journal secured on a frame rotatably mounting the platform and carrying fastening devices, designed as quick-locking mechanisms, for securing the projector to a vehicle.

The platform comprises parallel tubes connected with each other by reinforcing plates extending perpendicularly to the tubes, these reinforcing plates carrying locking devices for the missiles. By this arrangement, a simple and particularly easy and efficient design of the platform is obtained.

The missiles are arranged on the platform preferably in two staggered rows, and each row of missiles can be released separately by means of a handle cooperating with the locking devices. Care must be taken that the missiles of the second row are released only after the first row has been launched.

The reinforcing plates at the platform are formed with longitudinally extending roof-shaped elevations which are spaced laterally from each other a distance such that a missile is held between two elevations, corresponding to the inclination of the wings of the missile. The missile is supported with its wings or vanes crossing each other, for example, and can be locked by locking devices designed as clamping holders.

The elevation angle of the platform can be adjusted stepwise by means of two spring-loaded latches arranged on the base plate laterally opposite each other and which are engaged by gear segments arranged on the platform, the latches being unlocked jointly by a handle.

In order to achieve rapid exchangeability of the projector with respect to a vehicle, the projector has fastening devices for holding it on the vehicle, and which are arranged as quick-locking mechanisms. Each fastening device comprises a molded element provided with a toggle, and threadedly engaged and rotatable in a housing so that it may be displaced axially. The molded element has, at its free end, two opposing pin-type projections extending perpendicular to its longitudinal axis and intersecting the latter. At its end adjacent the toggle or operating handle, the molded element has articulated thereto two spring-loaded bolts arranged diametrically opposite each other and guided for longitudinal displacement in respective bearings rotatably mounted in the housing at diametrically opposed locations.

An object of the invention is to provide a missile projector or launcher adapted for readily interchangeable mounting on various types of vehicles.

Another object of the invention is to provide such a projector which may be traversed and which may have its angle of elevation adjusted.

A further object of the invention is to provide such a projector in which missiles are held securely during transport.

Yet another object of the invention is to provide such a projector including novel quick-operating latching mechanisms.

A further object of the invention is to provide such a projector which is self-contained with respect to the devices for launching, guiding and tracking the missiles.

Still another object of the invention is to provide such a projector which is simple and inexpensive to construct, and which may be readily and interchangeably mounted on any type of vehicle without the necessity of special tools or equipment.

A further object of the invention is to provide such a projector which is capable of very simple support and storage as a self-contained unit.

*Brief description of the drawings*

For an understanding of the principles of the invention reference is made to the following description of a typical embodiment thereof as illustrated in the accompanying drawings. In the drawings:

FIG. 3 is a perspective view of a detail of the projector shown in FIG. 1; and

FIG. 4 is a part perspective and part sectional view, on an enlarged scale, of a fastening means for securing the projector or launcher to a vehicle, the fastening means being shown in disengaged condition.

*Description of the preferred embodiment*

Figure 1:
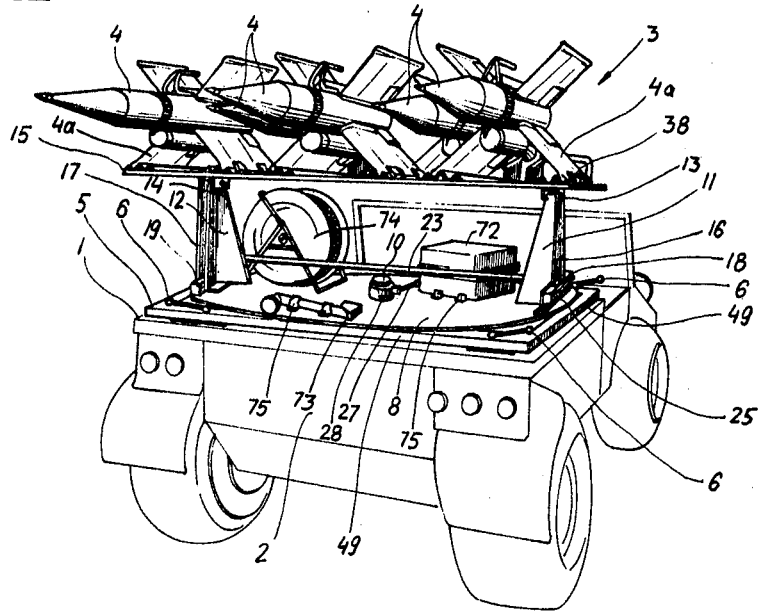
FIG. 1 is a perspective view of a cross-country vehicle carrying a projector embodying the invention, with two rows of staggered missiles locked on the projector.

Referring first to FIG. 1, a projector or launcher 3 embodying the invention, and described more fully herein after, is secured to the upper surface 1 of a cross-country vehicle 2. Projector 3 carries five missiles 4 arranged, in the illustrated example, staggered in two rows and releasably locked in position by fastening means described herein after.

Projector 3 comprised a frame 5 which is rectangular in plan and on which is mounted an oval base plate 8 for rotation about a journal 10 secured in the center of frame 5. Base plate 8 carries two diametrically opposite upright traverses or bearing blocks 11 and 12, each positioned adjacent the periphery of the base plate. A platform 15 is pivotally mounted on bearing blocks 12, for adjustment of the elevation angle of the missiles, the pivotal or swinging mounting of platform 15 being provided by the horizontally extending bolts 13 and 14, one in each of the bearing blocks 11 and 12, respectively.

The elevation of platform 15 can be effected in steps by the locking mechanisms illustrated in FIG. 3. Referring to FIGS. 1 and 3, the locking mechanisms consist of plates 16 and 17 at respective opposite sides of platform 15 and swinging with the platform about the pivot bolts 13 and 14. The lower ends of plates 16 and 17 are designed as gear segments 18 and 19. The space between the teeth of gear segments 18 and 19 is arranged to be engaged by a projection 21, each mounted on a spring loaded catch 24 on the end of a cross shaft 23. Shaft 23 is, in turn, rotatably mounted in the lower part of the bearing blocks 11 and 12, and can be turned, by means of handle 25, against the bias of a spring 22 so that catches 24 are swung down and projections 28 disengaged from gear segments 18 and 19.

If the vehicle stands, for example, on uneven or inclined ground, catches 24 can be released by handle 25 against the bias of springs 22 so that projections 21 are disengaged from gear segments 18 and 19. Platform 15 can then be turned about pivots 13 and 14 in the blocks 11 and 12, and can be brought, for example, into a substantially horizontal position and then be locked by release of handle 25.

Base plate 8 also has a locking mechanism 28 associated with the journal 10 and controlled by a hand lever 27. The base plate can thus be locked in any angular position relative to frame 5. After release of the clamping mechanism 28 by means of hand lever 27, the upper part of the projector 3 can be traversed.

Figure 2:
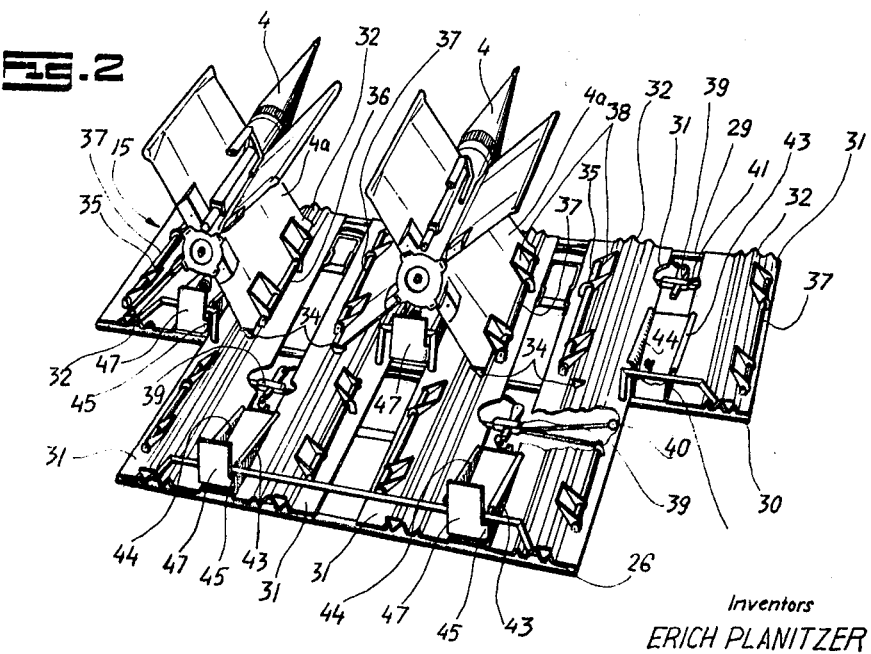
FIG. 2 is a perspective view of the platform of the projector shown in FIG. 1, partly in section and on an enlarged scale.

As best seen in FIG. 2, platform 15 has a stepped shape in plan, and comprises spaced parallel tubes 26, 29, and 30 extending parallel to the pivot axis of the platform. Reinforcing plates 31 and secured on tubes 26, 29, and 30 to extend transversely of the latter, so that the reinforcing plates 31 extend perpendicularly to the pivot axis of platform 15. These reinforcing plates are roof-shaped in end elevation of transverse cross section, and are arranged parallel to each other and so spaced from each other as to provide space of a missile 4, with its two crossed wings or vanes 4a, between each pair of adjacent elevations. Since the roof inclination corresponds to the inclination of the wings 4a, the corresponding wing faces bear on the laterally outer surfaces of a pair of elevation 32.

To secure the missiles during transportation thereof, clamping holders 35 are provided for each of the missiles. Each missile is positioned so that the rear end surfaces of its wings 4a engage limit stops 34. Each clamping holder 35 comprises two claws 28 secured, in axially spaced relation, to respective axles 36 and 37 which are rotatably mounted on platform 15. A lever and crank assembly is associated with the claws retaining one row of missiles 4, so that the row of missiles can be conjointly released by actuating a lever 40, for one row, or a lever 41 for the other row. For example, by operating hand lever 41, the front row of missiles, in the firing direction, can be released.

However, other release mechanisms, for example the jet operated unlocking device shown in German Patent No. 1,141,210, can be provided in place of the manually operated locking mechanisms. Here too, however, care must be taken, for example by electric interlocking, so that the front row of missiles is launched first and before the second row can be launched.

Behind each missile 4, a U-shaped cover plate 43 is secured on platform 15. The upper edges of the flanges of cover plates 43 are beveled toward the associated missile, and the side walls 45 of a pivoted U-shaped cover plate 47 bear against the inner surfaces of these flanges.

The means for securing the projector or launcher 3 to a vehicle are shown at 6 in FIGS. 1 and 4. Each of the fastening means 6 is secured close to a respective corner of frame 5 by means of screws 48 which connect U-shaped rails 49 of the frame with a housing 50 of fastening means 6 indexed in position by cylindrical pins 51 engaging circular apertures in rails 49. In the center of housing 50, there is a molded part 53 connected by a transverse pin 54 with a threaded bush 55. Bush 55 is threaded into housing 50 by virtue of its thread 56, so that is is rotatable about its vertical axis. The upper portion of molded part 53 carries a toggle lever 58, and the lower portion is formed with diametrically opposite projections 59 and 60.

The free ends of pins 54, extended through molded part 53, are articulated with two horizontally arranged bolts 64 and 65 loaded by respective springs 62 and 63. Bolts 64 and 65 are mounted for displacement, longitudinally of themselves, in respective bearings 66 and 67 rotatably mounted in housing 50 on a diameter thereof and adjacent the periphery of housing 50. Toggle 58 thus can be moved from the operative position into an inoperative position against the bias of springs 62 and 63, which provide a torque with respect to the axis of rotation of molded part 53.

When frame 5 is secured on the vehicle, projections 59 and 60 of molded part 53 are inserted through oblong extensions 69 of a circular recess 70 in surface 1 of the vehicle 2, and molded part 53 is turned, by toggle lever 58, through about 90°. Due to the pitch of the thread 56, the projections of the molded part are moved upwardly to press on the under side of the vehicle wall formed with the recess 70.

Base plate 8 is provided with quick-locking mechanisms 75 in the area between traverses or bearings 11 and 12, so that the devices necessary for launching, tracking and guiding the missiles can be readily secured to the base plate. For example, and as shown in FIG. 1 such devices may include a signal transmitter 72, a goniometric sight 73 and cable drum 74. At the firing site, the missiles arranged on the platform 15 can be launched successively after openings the signal transmitter 72 and attaching the goniometric sight 73. For the sake of completeness, it should be mentioned that the electric lines connections of the individual missiles to the signal transmitter, which form no part of the present invention, must naturally be connected first. It is also possible to release the launching, tracking and guiding devices, secured on base plate 8 by quick-locking mechanisms 75, and transport them to the position of a gunner in the proximity of the vehicle. For connecting the signal transmitter with the missile projector and the individual missiles, respectively, a cable is provided on the cable drum 74.

While a specific embodiment of the invention has been shown and described in detail to illustrate the application of the principles of the invention, it will be understood that the invention may be embodied otherwise without departing from such principles.

What is claimed is:

1. A launcher for jet-propelled guided missiles, constructed for transportation and storage as a complete weapon unit, separately from and independently of any launching vehicle, and further constructed for readily disengageable temporary mounting, in the field and as a complete weapon unit, on vehicles having a load-supporting surface but not designed as mobile missile launchers, said launcher comprising, in combination, a missile transporting and launching platform; a plurality of guided missiles mounted on said launching platform; a frame arranged for placement on the load-suporting surface of any such vehicle; fastening means on said frame selectively operable to disengageably and interchangeably connect the latter to the load-supporting surface of any such vehicle, said fastening means being constituted by quick-locking mechanisms; a base plate rotatable on said frame for angular adjustment in traverse; locking means to lock said base plate in angularly adjusted position on said frame; and a pair of dimetrically opposite bearing supports on said base plate supporting said platform for angular adjustment in elevation; means for launching, tracking and guiding said missiles being mounted on said base plate between said bearing supports for transportation and storage as a part of said complete weapon unit, said complete weapon unit including quick-locking mechanisms securing said devices on said base plate.

2. A launcher for jet-propelled guided missiles, constructed for transportation and storage as a complete weapon unit, separately from and independently of any launching vehicle, and further constructed for readily disengageable temporary mounting, in the field and as a complete weapon unit, on vehicles having a load supporting surface but not designed as mobile missile launchers, said launcher comprising, in combination, a missile transporting and launching platform; a plurality of missiles mounted on said launching platform; support means mounting said platform for adjustment of the angle of elevation thereof and adjustment of the angle of traverse thereof, said support means being arranged for placement on the load-supporting surface of any such vehicle; and fastening means on said support means selectively operable to disengageably and interchangeably connect the latter to the load-supporting surface of any such vehicle, said fastening means being constituted by quick-locking mechanisms; said launcher storing, on its support means, means for launching, tracking and guiding said missiles mounted on said launching platform; said platform comprising plural parallel tubes and reinforcing plates secured to said tubes and extending perpendicularly thereto; said reinforcing plates being roof-shaped in end elevation and in cross section and spaced laterally from each other a distance such that each missile is received between two elevations; the elevations having inclined lateral surfaces engageable by the crossed guide wings of a missile; and clamping holders on said reinforcing plates securing said missiles on said platform.

3. A launcher for jet-propelled guided missiles, as claimed in claim 2, in which said missiles are mounted on said platform in at least two rows extending transversely of said platform, the missiles in adjacent rows being staggered laterally with respect to each other; said clamping holders being respective to each row; and respective hand levers cooperable with all the clamping holders of a respective row to release all of the clamping holders of the associated row simultaneously.

4. A launcher for jet-propelled guided missiles, as claimed in claim 1, including a pair of gear segments secured to said platform, each adjacent a respective one of said bearing supports and pivotal with said platform during angular adjustment of the latter in elevation; and a pair of spring-biased releasable catches on said base plate each cooperable with a respective one of said gear segments to lock said platform in angularly adjusted position, said catches being interconnected for conjoint operation; said fastening means each comprising a housing secured to said frame and having a threaded aperture therein; a bush threaded through said aperture and rotatable therein; a molded part conformingly inserted through said bush and having a cylindrical lower end formed with a pair of diametrically opposite radial extensions, said cylindrical lower end and its extensions being insertable through a correspondingly-shaped aperture in the load-supporting surface of any such vehicle when said bush has one angular position whereby said projections are disposed beneath said load-supporting surface and, when said bush is turned to another angular position, said projections engage the undersurface of said load-supporting surface to lock said frame to said load-supporting surface; a pin extending diametrically of said molded part and projecting at each end thereof through said bush to extend exteriorly from said bush, said pin comprising part of a toggle mechanism for locking said bush in either of the two mentioned angular positions; said toggle mechanism including a pair of bolts each articulated at one end to a projecting end of said cross pin, a pair of diametrically opposed bearings in said housing and spaced from said bush, each bolt extending slidably through an aperture in a respective bearing and said bearings being rotatable in said housing, and spring means embracing each bolt and engaged between the articulated end of the respective bolt and the associated bearing; said toggle mechanism further including toggle operating lever secured to an extending from the upper end of said molded part above said bush.

References Cited

UNITED STATES PATENTS

| 2,354,153 | 7/1944 | Stebbins | 89—37 |
| 2,429,021 | 10/1947 | Gould et al. | 89—1.815 |
| 2,771,811 | 11/1956 | Lauritsen | 89—1.815 |

FOREIGN PATENTS 1,167,227  4/1964  Germany.

SAMUEL W. ENGLE, *Primary Examiner.*

U.S. Cl. X.R.

89—1.806, 1.819 37